United States Patent
Yang et al.

(10) Patent No.: US 9,704,167 B2
(45) Date of Patent: Jul. 11, 2017

(54) ELECTRONIC DEVICES AND SERVICE MANAGEMENT METHODS FOR PROVIDING SERVICES CORRESPONDING TO DIFFERENT SITUATIONS

(71) Applicant: Acer Incorporated, New Taipei (TW)

(72) Inventors: Tsung-Hang Yang, New Taipei (TW); Shu-Han Wang, New Taipei (TW); Yu-Hsiang Wu, New Taipei (TW); Ling-Fan Tsao, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 107 days.

(21) Appl. No.: 14/735,414

(22) Filed: Jun. 10, 2015

(65) Prior Publication Data
US 2016/0132776 A1    May 12, 2016

(30) Foreign Application Priority Data
Nov. 6, 2014   (TW) .............................. 103138487 A

(51) Int. Cl.
*G06F 17/00*    (2006.01)
*G06N 5/02*    (2006.01)
*G06Q 30/02*    (2012.01)

(52) U.S. Cl.
CPC .................... *G06Q 30/02* (2013.01)

(58) Field of Classification Search
None
See application file for complete search history.

(56) References Cited

U.S. PATENT DOCUMENTS

2012/0059780 A1*  3/2012  Kononen .......... H04M 1/72522
                                                  706/14
2013/0231947 A1*  9/2013  Shusterman ........ G06F 19/3443
                                                   705/2

OTHER PUBLICATIONS

Frequency-based feature selection, http://nlp.stanford.edu/IR-book/html/htmledition/frequency-based-feature-selection-1.html, 2008, pp. 1.*

* cited by examiner

*Primary Examiner* — Li-Wu Chang
(74) *Attorney, Agent, or Firm* — McClure, Qualey & Rodack, LLP

(57) ABSTRACT

Service management methods for use in an electronic device are provided, including the steps of: providing a record including at least one first event and possible probability parameters corresponding thereto, each having a weight; collecting device status information regarding information of current status of the electronic device, user operation behavior information and event triggering information using a data collector; evaluating a first evaluation value according to the device status information regarding information of current status of the electronic device, user operation behavior information and event triggering information, the possible probability parameters and respective weights of the record; and inferring that the first event reoccurs and performing a service corresponding to the first event when the first evaluation value has exceeded a threshold value.

11 Claims, 5 Drawing Sheets

| Event Name | Possible probability parameters | | Status/setting value | Weight |
|---|---|---|---|---|
| Meeting event | Device status information | GPS location power plugged. ⋮ | 26th floor no ⋮ | W1 W2 ⋮ |
| | User operation behavior information | Word Notepad LINE ⋮ | open open close ⋮ | W3 W4 W5 ⋮ |
| | Event triggering information | Calendar data Mute ⋮ | Yes Yes ⋮ | W6 W7 ⋮ |

FIG. 3

ELECTRONIC DEVICES AND SERVICE MANAGEMENT METHODS FOR PROVIDING SERVICES CORRESPONDING TO DIFFERENT SITUATIONS

CROSS REFERENCE TO RELATED APPLICATIONS

This Application claims priority of Taiwan Application No. 103138487, filed on Nov. 6 2014, the entirety of which is incorporated by reference herein.

BACKGROUND OF THE INVENTION

Field of the Invention

The disclosure relates generally to electronic devices and related service management methods and, more particularly, to electronic devices and related service management methods that provide services corresponding to different situations.

Description of the Related Art

Recently, portable devices such as handheld devices have become more and more technically advanced and multifunctional. For example, a handheld device may receive email messages, have an advanced contact management application, allow media playback, and have various other functions. Because of the conveniences of devices with multiple functions, the devices have become necessities of life.

As user requirements and behaviors change and various sensors and related awareness software develop, context-aware technology is widely used in portable devices. Through sensing by a variety of sensor, the most appropriate situation-oriented services can be provided to users. For example, when the user is in a meeting situation, the phone mute mode should be adopted and thus the mobile phone may automatically switch to the mute mode when the phone detects "the user is in a meeting". Current technologies such as Google™ Now can provide phone notification or silence options based on the context of applications (such as meeting times scheduled in phone calendar events).

However, in the current technologies, when a provisional meeting is called, since the user has not scheduled one, the time of the meeting may not be displayed as a calendar event, and the system may not be able to determine the user's meeting situation. As a result, services such as automatic mute may not be provided. In addition, as the current technologies are based only on possibilities from past data analysis to further provide extended information, it is possible that services or information provided cannot provide appropriate assistance to users, but making user's problems instead.

BRIEF SUMMARY OF THE INVENTION

Service management methods for use in an electronic device and related electronic devices are provided.

In an embodiment, a service management method for use in an electronic device is provided, comprising the steps of: providing a record, wherein the record comprises at least one first event and a plurality of possible probability parameters corresponding thereto and each possible probability parameter has a weight corresponding to the first event; collecting device status information regarding information of current status of the electronic device, user operation behavior information and event triggering information through a data collector; evaluating a first evaluation value according to the device status information regarding information of current status of the electronic device, the user operation behavior information and the event triggering information and the possible probability parameters and respective weights of the record; and inferring whether the first event reoccurs based on the first evaluation value and a threshold value; wherein the first event reoccurs and a service corresponding to the first event is performed when the first evaluation value has exceeded a threshold value An embodiment of an electronic device includes a storage unit and a data processing unit. The storage unit stores a record, wherein the record comprises at least one first event and a plurality of possible probability parameters corresponding thereto and each possible probability parameter has a weight corresponding to the first event. The data processing unit is coupled to the storage unit and is arranged for collecting device status information regarding information of current status of the electronic device, user operation behavior information and event triggering information through a data collector, evaluating a first evaluation value according to the device status information regarding information of current status of the electronic device, the user operation behavior information and the event triggering information and the possible probability parameters and respective weights of the record and inferring whether the first event reoccurs based on the first evaluation value and a threshold value; wherein the data processing unit infers that the first event reoccurs and performs a service corresponding to the first event when the first evaluation value has exceeded a threshold value.

Service management methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein:

FIG. 3 is a schematic diagram illustrating an embodiment of portion content of individual events recorded of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Embodiments of the invention provide electronic devices and service management methods thereof, which can provide corresponding context-based services through a cross-platform service information model on the basis of probability and use users' operating habits or behaviors to serve as service sources. When a user's operations or behaviors regularly occur, the system can record possible overall probability parameters and changes in the statuses of neighboring devices when the operations or behaviors occur. In addition, the frequency of occurrences is converted into a corresponding correlational probability in order to learn about services users truly need under various situations so as to automatically control the electronic devices to provide suitable services and provide more smart services to the users.

Figure 1:
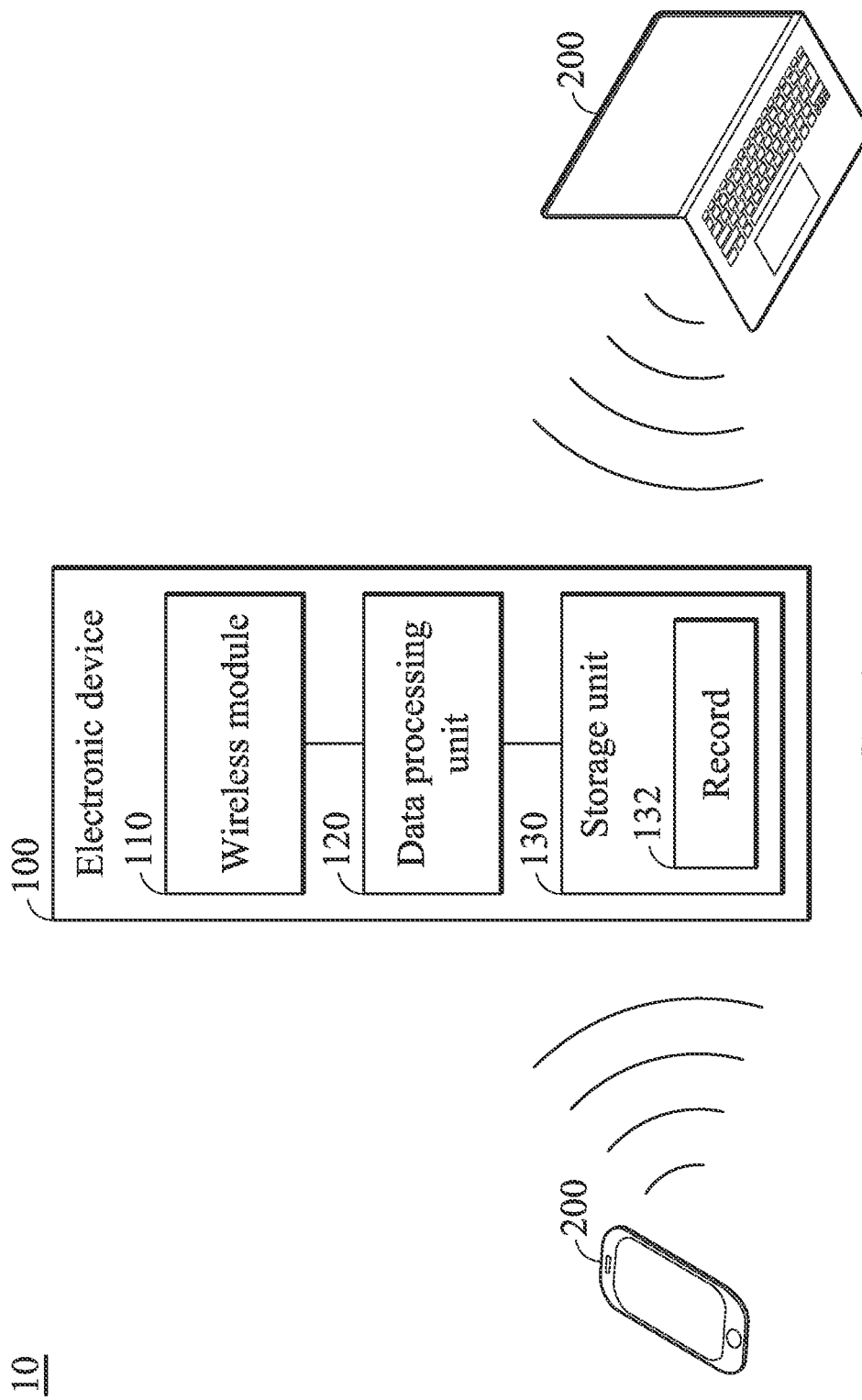
FIG. 1 is a schematic diagram illustrating an embodiment of a service management system according to the invention.

FIG. 1 is a schematic diagram illustrating an embodiment of a service management system according to the invention. The service management system 10 of the invention may comprise one or more electronic devices 100 and neighboring devices 200, wherein the electronic devices 100 and the neighboring devices 200 are within a limited distance, and are communicated with each other through a wireless communication protocol, such as an Bluetooth, ZFC, Zigbee or WIFI protocol and so on. The neighboring device 200 may be electronic devices which are the same as the electronic devices 100 or other type of electronic devices, such as a smart phone, a PDA (Personal Digital Assistant), a laptop computer, a tablet computer and so on. Each neighboring device 200 may establish a wireless connection with the respective electronic device 100 through a specific wireless communication protocol such as WIFI protocol to wirelessly connect to the electronic device 100 and thus may transmit data to or receive data from the electronic device 100 wirelessly, such as transmits WIFI signals to the electronic device 100 through a WIFI protocol.

The electronic device 100 comprises a wireless module 110, a data processing unit 120 and a storage unit 130. The wireless module 110 may establish a wireless connection with the respective neighboring device 200 through a specific wireless communication protocol, such as a Bluetooth, ZFC, Zigbee or WIFI protocol and so on, to wirelessly connect each other and thus may perform wireless reception and transmission therebetween. In one embodiment, the wireless module 110 may further comprise a baseband unit (not shown) and a radio frequency (RF) unit (not shown). The baseband unit may contain multiple hardware components to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communications system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. The data processing unit 120 may further control the operation of the wireless module 110 and other functional components, such as a screen unit (not shown) and/or keypad serving as the MIMI (man-machine interface), the storage unit 130 storing the program codes of applications or communication protocols, or others. In some embodiments, the screen unit may be a screen integrated with a touch-sensitive device (not shown). The touch-sensitive device has a touch-sensitive surface comprising sensors in at least one dimension to detect contact and movement of at least one object (input tool), such as a pen/stylus or finger near or on the touch-sensitive surface. The screen unit can display related data, figures, and so on.

The storage unit 130 may be various types of storage devices, such as built-in memory or an external memory card used to store a record 132 related to user habit. The record 132 records the user's habitual learning results in a period of time. When the user's operations or behaviors occur regularly, the system records the operations or behaviors as a single event and records the overall possible probability parameters of the electronic device and changes in the context of neighboring devices when events occur, which are used for subsequent processing. Specifically, the record 132 can include one or multiple events (such as meeting events) and all possible probability parameters, of which every possible probability parameter corresponding to a different event may have a different weight. The record 132 will be discussed further in the following paragraphs.

In one embodiment, possible probability parameters may include device status information, user operation behavior information and/or event triggering information. In particular, the device status information represents information regarding the statuses of setting values and parameter values of various sensors on the electronic device 100; user operation behavior information includes application (APP) usage related information, such as information regarding time information and location information for indicating when and where the user use, which APP is used, how much time is spent and other statistical information; and event triggering information represents the configuration information of setting values in various systems, such as whether the 3G or WIFI functional module is turned on, if calendar events are recorded, and if an APP is turned on or off.

In some other embodiments, probability parameters may also include parameters related to the neighboring device 200, including device status information, user operation behavior information and/or event triggering information of the neighboring device 200.

The data processing unit 120 which is coupled to the wireless module 110 and the storage unit 130 can perform the service management method of the present invention, which will be discussed further in the following paragraphs. To be more specific, the data processing unit 120 can perform a learning procedure, which is used to learn about user habits and generate the record 132 recording history-learning result of user habits in a period of time (such as one week, one month, one year, etc.). The data processing unit 120 can further perform an identification procedure, which is used for determining whether or not a certain event in the record 132 reoccurs based on the above-mentioned record 132 and current device status information of the electronic device 100, user operation behavior information and/or event triggering information, thereby determining whether corresponding services are provided.

Figure 2:
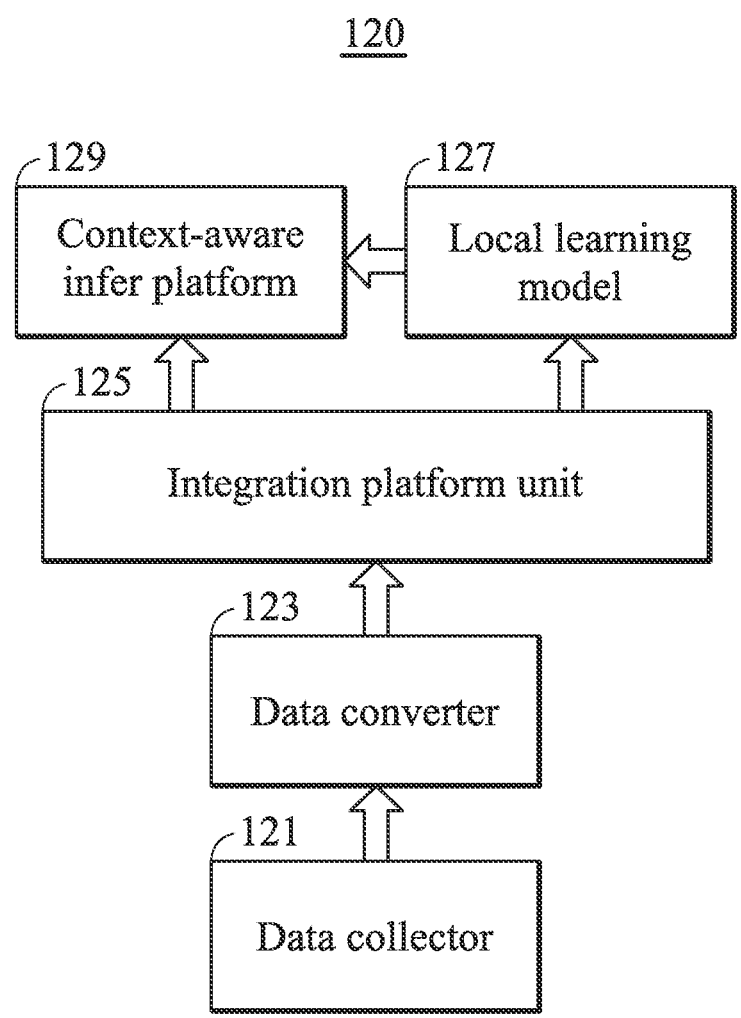
FIG. 2 is a schematic diagram illustrating an embodiment of a detailed data processing unit of the invention.

The data processing unit 120 can comprise appropriate software or hardware structures for implementing the service management method of the invention. For example, FIG. 2 is a schematic diagram illustrating an embodiment of a detailed data processing unit of the invention. As shown in FIG. 2, the data processing unit 120 may include a learning system, which contains a data collector 121, a data converter 123, an integration platform unit 125, a local learning model 127, a context-aware infer platform 129 and so on, but the invention is not limited thereto. The data collector 121 can be used to collect information from various built-in sensor devices in an electronic device and their sensors (such as setting the alarm clock, switching to mute, and other actions)

in order to provide users with basic services. For example, the data collector 121 can collect information from built-in sensor devices in an electronic device and their sensors in order to learn about users' conditions on regular working days and set the alarm clock based on daily measurements taken of the time required by users before leave home. The data converter 123 can convert sensor information collected from the data collector 121 into basic information needed by the integration platform unit 125, such as converting the employer's email "boss@gmail.com" into important meeting participants, etc. The integration platform unit 125 is used to convert basic information converted by the data converter 123 into the method needed for the learning engine or inference engine. In addition, the integration platform unit 125 can further convert information or models sent back by an external device such as the neighboring device 200. The local learning model 127 can be used to learn about the user pattern of electronic device 100 and convert it into various rules needed by the inference engine. The context-aware infer platform 129 can carry out inferences based on the current information and models collected in order to infer the situation the current user or device is in. Therefore, the data processing unit 120 can engage in user habit learning and related data collection through the data collector 121, the data converter 123, the integration platform unit 125, the local learning model 127, and the context-aware infer platform 129 so as to generate the record 132 and determine the situation of electronic device 100. The above-mentioned data collector 121, data converter 123, integration platform unit 125, local learning model 127, and context-aware infer platform 129 may be composed of suitable software or hardware circuits, or a combination thereof.

The data processing unit 120 first learns about the user's operation behaviors and relevant sensor statuses and device statuses corresponding thereto for a period of time, such as whether the power of electronic device 100 has been plugged, if the 3G model is on, if the calendar of events contains data, if the alarm clock is switched on and so on when an event occurs through the data collector 121, the data converter 123, the integration platform unit 125, the local learning model 127 and the context-aware infer platform 129. Additionally, relevant changes in the statuses of neighboring devices, such as whether the power of the neighboring device 200 has been plugged, if the location is moved to a specific place, etc, at the time an event occurs are also recorded and each possible probability parameter is provided with a weight. Then, based on the weights and the possible probability parameters, whether or not a specific event has been satisfied is determined. For example, if the event of a meeting in session reoccurs is determined in order to provide smart silence services during unscheduled time. Weights correspond to the frequency of probability parameters that occur in the first event. Therefore, the higher the occurrence, the higher the weight is. When the occurrence of the first event in a certain probability parameter is zero, the weight of the said probability parameter is set as zero. FIG. 3 is a schematic diagram illustrating an embodiment of the content of individual events recorded of the invention. As shown in FIG. 3, data item 300 is an example of the represented meeting events in the record 132, the related possible probability parameters and their weights in the record 132. It is understood that the possible probability parameters, weights, and other columns as well as numbers are used for the convenience of illustration only, and the invention is not limited thereto. In other words, the disclosed method can be applied to any device with record formats, items contents, numbers, etc. that have the same effect. It is to be understand that, as shown in FIG. 3, assuming that the GPS location is displayed as 26F, when in the unplugged state and with the Notepad APP turned on, the estimation value W can be W1+W2+W4. Accordingly, the related possible probability parameters and their weights in the various events in the record 132 shall serve as references for deriving at corresponding evaluation values.

In some embodiments, when the user has a single device, the electronic device 100 can automatically learn about user habits under a variety of contexts and provide users with corresponding services.

Figure 4:
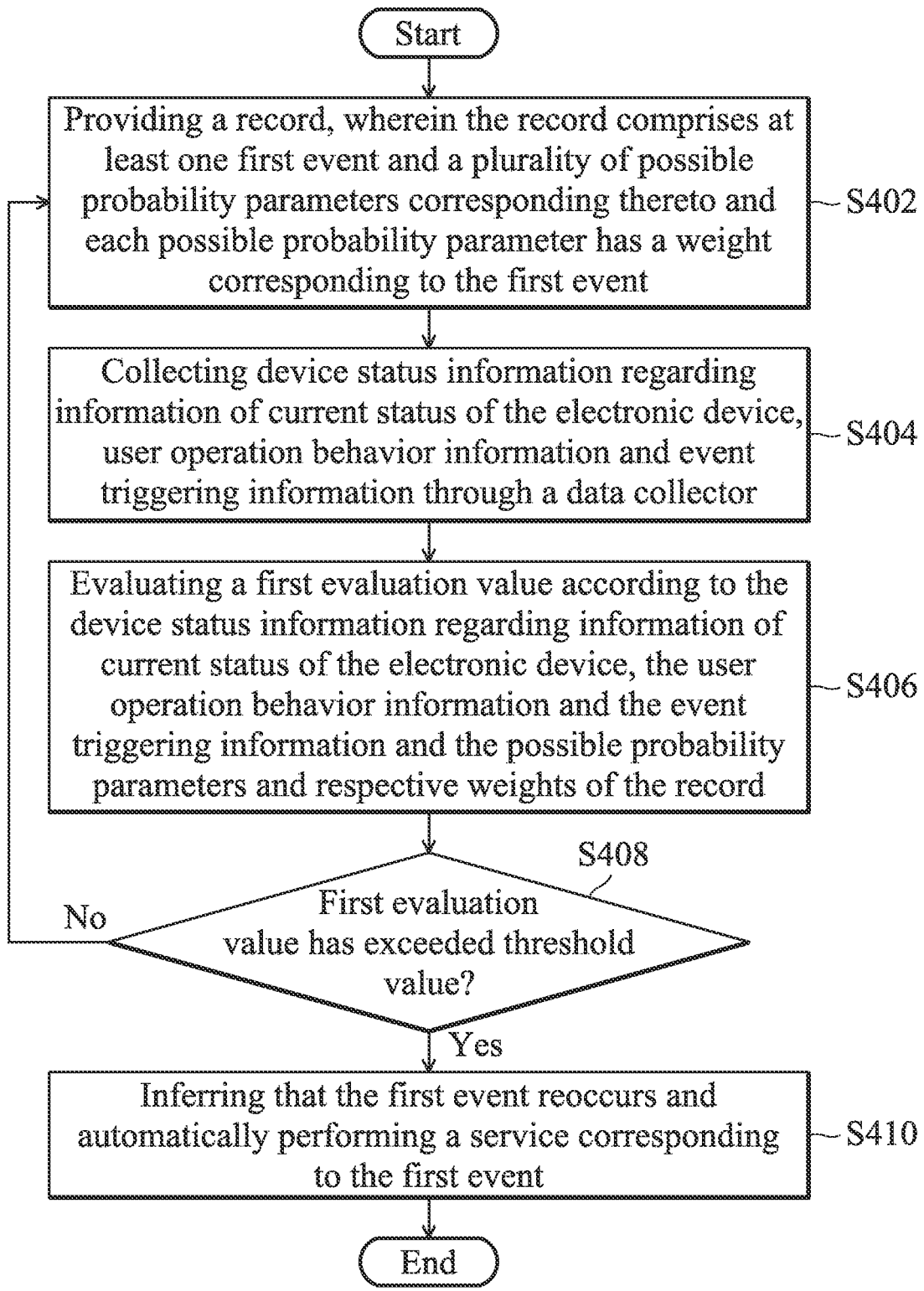
FIG. 4 is a flowchart of an embodiment of a service management method of the invention.

FIG. 4 is a flowchart of an embodiment of a service management method of the invention for identifying whether a specific event occurs and providing corresponding services when specific events occur. Please refer together with FIGS. 1 and 4. The service management method can be used for an electronic device, such as a portable device, such as a PDA, a smartphone, a mobile phone, an MID, a laptop computer, a car computer, a digital camera, a multi-media player, a gaming device, or any other type of mobile computational device, however, it is to be understood that the invention is not limited thereto. For example, in this embodiment, the method can be performed by the data processing unit 120 of the electronic device 100 as shown in FIG. 1.

First, in step S402, one record is provided, which contains at least one first event and several possible probability parameters that correspond to the first event. Additionally, each probability parameter has one weight that corresponds to the first event, such as the record 132.

Then, in step S404, through a data collector, device status information regarding information of current status of the electronic device, user operation behavior information, and event triggering information are continually collected. In particular, the device status information regarding information of current status of the electronic device may include various sensor status information of the electronic device; the user operation behavior information may include information related to application usage and the event triggering information may comprise configuration setting information of the electronic device. For example, through the above-mentioned data collector, data processing unit 120 can collect information of the various sensor devices and sensors in the electrician device, user operation behaviors and various related system setting configurations, such as whether or not the power of electronic device 100 is plugged on, whether or not the 3G module is switched on, whether or not the calendar of events contains data, whether or not the alarm clock is switched on, etc. when a certain event occurs, in order to obtain device status information regarding information of current status of the electronic device, user operation behavior information, and event triggering information.

After obtaining the device status information regarding information of current status of the electronic device, user operation behavior information, and event triggering information, in step S406, a first evaluation value was calculated according to the device status information regarding information of current status of the electronic device, user operation behavior information, and event triggering information, as well as possible probability parameters and weights in the records. Then, in step S408, whether or not the first evaluation value has exceeded the threshold value is determined. If the first evaluation value is smaller than or equal to the threshold value (No in step S408), it was inferred that the first event did not occur again, thus services corresponding to the first event were not be performed, and the flow returns to step S402. Conversely, when the first evaluation value has exceeded the threshold value (Yes in step 408), in step S410, which means that the conditions at the time the first event occurred, to a certain extent, showed consistency, thus it is inferred that the first event reoccurs and the service corresponding to the first event is then performed automatically. Specifically, the reoccurrence of the first event refers to a certain event that once occurred as recorded in the record 132, such as a meeting event.

For example, assuming the learning results indicates that when the first event is a meeting event, users usually run to the conference room located on the 26th floor, and their laptops are usually unplugged (i.e. the external power pulled off and the battery mode on). Thus, when the laptop location information represents 26F and the calendar of events shows no meeting, although the meeting information is not displayed in the calendar of events, since the laptop location information shows 26F and in that it is in the unplugged state, the laptop may still determine a meeting event has reoccurred and then perform automatic mute.

In some embodiments, after performing services corresponding to the first event, the electronic device may continue to collect device status information regarding information of current status of the electronic device, user operation behavior information and event triggering information and an evaluation value was calculated according to the device status information regarding information of current status of the electronic device, user operation behavior information and event triggering information, as well as the possible probability parameters and weights in the records. Then, based on the determination of whether or not the evaluation value was greater than a specific threshold value (e.g. 80%), whether or not the first event was finished was inferred. Additionally, after the first event was inferred as finished, the services corresponding to the first event were automatically terminated.

In some embodiments, when several electronic devices are available and each electronic device has an independent learning system as aforementioned, the abovementioned learning system can be used to integrate the services learned through the various devices, thus enabling the data processing unit to engage in cross-platform services based on users' different use conditions. For example, the user may have a mobile phone and a laptop at the same time, and the learning systems of the invention are installed on both. Assuming the mobile phone is the master device, in addition to collecting the current status information of the possible probability parameters under certain conditions, the mobile phone may also collect the current status information of the possible probability parameters of the laptop under certain conditions. Then, based on the information collected, whether or not a certain user event occurs can be determined.

Figure 5:
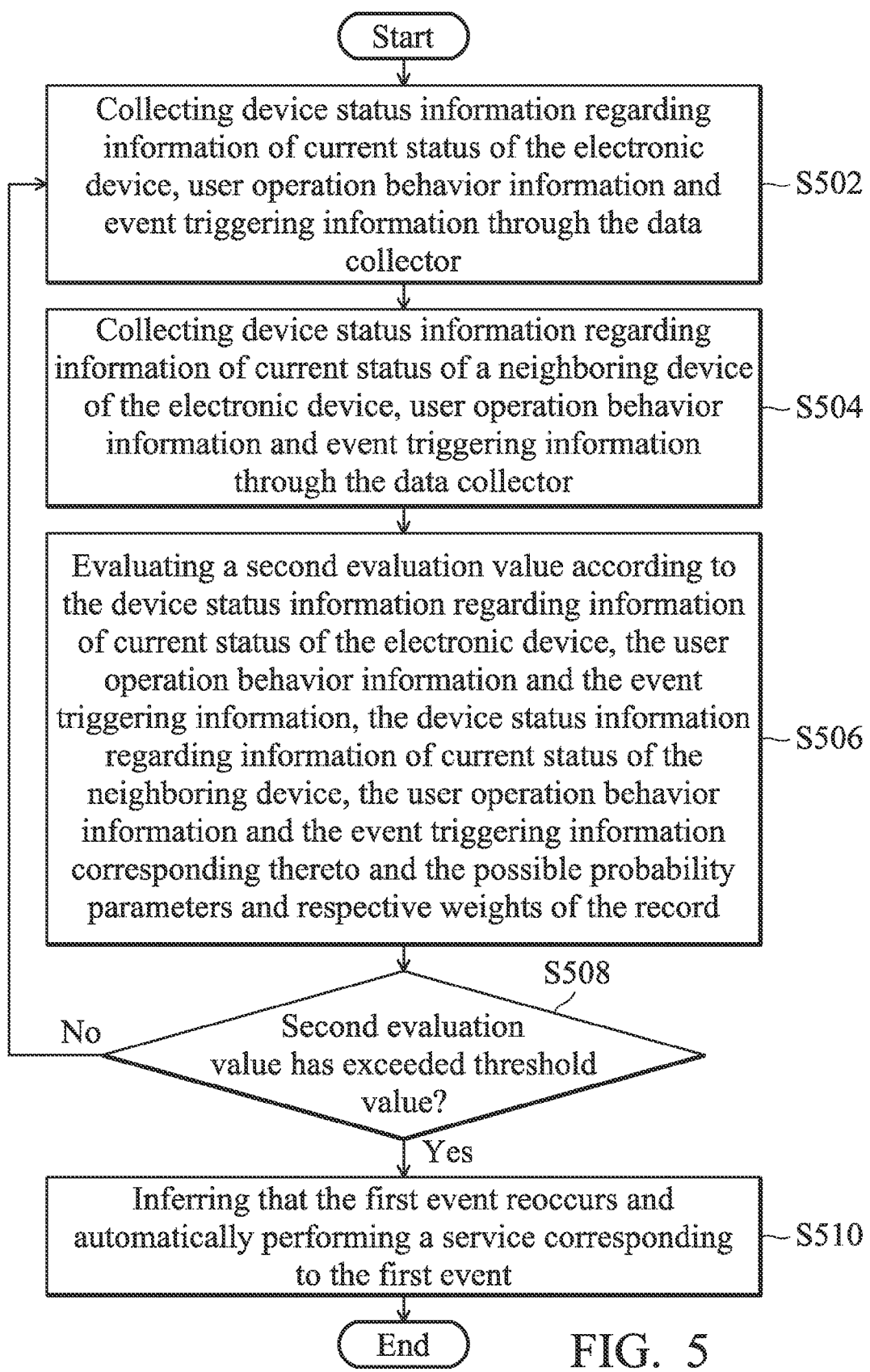
FIG. 5 is a flowchart of another embodiment of a service management method of the invention.

FIG. 5 is a flowchart of another embodiment of a service management method of the invention for identifying whether a specific event occurs and providing corresponding services when specific events occur. Please refer together with FIGS. 1 and 5. The service management method can be used for an electronic device, such as a portable device, such as a PDA, a smartphone, a mobile phone, an MID, a laptop computer, a car computer, a digital camera, a multi-media player, a gaming device, or any other type of mobile computational device, however, it is to be understood that the invention is not limited thereto. For example, in this embodiment, the method can be performed by the data processing unit 120 of the electronic device 100 as shown in FIG. 1. It is to be noted that, in this embodiment, the electronic device can be a mobile phone, and the neighboring device can be a laptop. It is assumed that the storage unit 130 of the electronic device 100 has already stored a record 132 which comprises at least one first event and several possible probability parameters corresponding to the first event and that each probability parameter has a weight corresponding to the first event.

First, in step S502, device status information regarding information of current status of the electronic device, user operation behavior information, and event triggering information corresponding thereto are collected through the data collector.

Then, in step S504, device status information regarding information of current status of the neighboring device, user operation behavior information, and event triggering information corresponding thereto are collected through the data collector.

After obtaining the device status information regarding information of current status of the electronic device, user operation behavior information, and event triggering information corresponding thereto and the device status information regarding information of current status of the neighboring device, user operation behavior information, and event triggering information corresponding thereto, in step S506, a second evaluation value was calculated according to the device status information regarding information of current status of the electronic device, user operation behavior information and event triggering information and the device status information regarding information of current status of the neighboring device, user operation behavior information, and event triggering information corresponding thereto, as well as possible probability parameters and weights in the records. Then, in step S508, whether or not the second evaluation value has exceeded the threshold value is determined. If the second evaluation value is smaller than or equal to the threshold value (No in step S508), it was inferred that the first event did not occur again, thus services corresponding to the first event were not be performed, and the flow returns to step S502. Conversely, when the second evaluation value has exceeded the threshold value (Yes in step 508), in step S510, which means that the conditions at the time the first event occurred, to a certain extent, showed consistency, thus it is inferred that the first event reoccurs and the service corresponding to the first event is then performed automatically. For example, assume that the learning results represent that when the first event is a meeting event, users usually run to the conference room located on the 26th floor, and the user may carry a mobile phone (electronic device) and laptop (neighboring device), wherein the mobile phone will be switched to mute, while the laptop is usually in the unplugged status (i.e. the external power pulled off and the battery mode on). Therefore, when the location information represents 26F and the calendar of events shows "a meeting in session", the corresponding service can be "automatic phone mute".

In current techniques, if the calendar of events shows no "meeting" time, due to the lack of meeting records, the mobile phone cannot automatically switch to mute. When this happens, the user has to mute the phone manually. However, according to the service management method of the invention, since the location information represented is 26F, the mobile phone and laptop both fit the location information of 26F. In addition, since the requirement of the laptop in the unplugged status, the condition has been met to some extent (e.g. the probability of a meeting event occurring exceeds 60%), the "meeting event" has been satisfied may be determined according to the invention and thus automatic phone mute service can still be provided.

In a meeting example, it is to be understand that the occurrence of the meeting event may not only associated with the calendar, but also associated with whether the laptop has power plugged and whether the locations of the phone and the laptop have been moved to the 26th floor, so when there is a temporary meeting occurrence and is not presented in the calendar, according to the cross-platform architecture of the present invention, the system may perform the cross-platform collection to collect all the possibilities, it is still possible to infer that the user is in a meeting and the phone is automatically transferred into muted accordingly.

In some embodiments, when the learning system of the invention is available in several electronic devices, any one of the devices may be converted into an inference and learning service center thereamong. In addition to the basic functions available on one's device, the service conditions of other devices will also be integrated at the same time in order to infer service devices, time, and methods most suitable for users. In some embodiments, the electronic device may selectively perform the respective service on itself or on the neighboring device. For example, when the decision to provide clock service has been made, the electronic device in closest proximity to the user, such as a smart watch, will be determined to provide the clock service in order to conveniently wake the user. Moreover, since all the learning system services are available on the user's private device, there is more security and privacy compared to the cloud system. In one embodiment, the electronic device may also control the neighboring device to perform other services. For example, assume that the user has both a mobile phone and a laptop, it may guess that the user is approaching home based on the mobile phone location and then the video streams being played on the mobile phone can be pre-downloaded on the laptop at home to enable the user to watch the video on the bigger screen at home once the user reaches home.

In some embodiments, several electronic devices can be linked to an external cloud system to upload services learned on an electronic device to the external cloud system, thereby allowing the external cloud system to perform statistics and analysis of the user's different conditions of use, provide suggestions, and offer more diversified services. For example, the external cloud system can perform data mining or data uploaded by various electronic devices in order to find the most commonly used services, which will be supplied to the user. For example, by collecting the condition of new global software in use, the latest software can be recommended to the user.

For example, in one embodiment, the first event may be an event of "whether a meeting is in session", and the smart mute function is the service provided. For example, when "a meeting event" has reoccurred is automatically determined, the mute function on the electronic device may be automatically switched on. After leaving the conference room, the "meeting event" completed may then be automatically determined, the mute function on the electronic device can thus be automatically turned off, and the volume can be adjusted accordingly.

In another embodiment, the first event may be an event of "returning home", while power control is the service provided. For example, assume that the user may wish to keep at least 20% power when returning home, it may automatically adjust the number of APP opened and the brightness of the screen to reduce power consumption, so that the user can have at least 20% of power before reaching home (e.g. The distance from home can be determined based on the location provided by a GPS sensor).

Since all the events may be pre-process in the 0 or 1 form, communication with the electronic device itself or a neighboring device (such as the characteristics of the mobile phone or laptop) can be performed through the cross-platform structure, thereby enabling the learning system to divide into an independent unit (mobile phone) and cross-platform units (mobile phone+laptop) when performing model training. When the system is capable of detecting multiple units, richer context inferences and services can be provided. When only independent units are detected, basic context inferences and services can also be performed.

Therefore, the electronic devices and related service management methods of the invention can perform an overall assessment of the possible parameters of one event such as one operation or behavior so that even if one of the parameters has not occurred, the system can predict whether the user may perform operations or behaviors in advance and provide corresponding services. In addition, as the generation of services is based on user feedbacks and can only be included when occurrences has exceeded a certain threshold value, which means the service is the action most needed by the user, thus matching with the user's actual needs and providing better user experience. In addition, through the learning system with the context-aware inference structure that can be connected to the external cloud system to derive at automatic inferences of the invention, each device can use various information on the device to infer user operation habit after a period of learning, thereby user-exclusive personal services can be provided. Furthermore, the various device statuses of users can be integrated to find cross-device use statuses of users, thereby providing more diverse services.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A service management method for use in an electronic device, comprising:
    providing a record, wherein the record comprises at least one first event and a plurality of possible probability parameters corresponding thereto and each possible probability parameter has a weight corresponding to the first event;
    collecting device status information regarding information of current status of the electronic device, user operation behavior information and event triggering information through a data collector;
    evaluating a first evaluation value according to the device status information regarding information of current status of the electronic device, the user operation behavior information and the event triggering information and the possible probability parameters and respective weights of the record; and
    inferring whether the first event reoccurs based on the first evaluation value and a threshold value;
    wherein the first event reoccurs and a service corresponding to the first event is performed when the first evaluation value has exceeded a threshold value, and wherein the service management method further comprises:
collecting device status information regarding information of current status of the electronic device, the user operation behavior information and the event triggering information through the data collector after the service corresponding to the first event is performed;
evaluating a second evaluation value according to the device status information, the user operation behavior information and event triggering information of the electronic device and the possible probability parameters and respective weights of the record; and
inferring whether the first event is finished based on the second evaluation value and the threshold value, wherein the first event is inferred as being finished when the second evaluation value has exceeded the threshold value; and
automatically terminating the performance of the service corresponding to the first event when inferring that the first event is finished.

2. The service management method of claim 1, further comprising:
collecting device status information regarding information of current status of a neighboring device of the electronic device, user operation behavior information and event triggering information for the neighboring device of the electronic device through the data collector;
evaluating a second evaluation value according to the device status information, the user operation behavior information and event triggering information of the electronic device, the device status information, the user operation behavior information and event triggering information of the neighboring device and the possible probability parameters and respective weights of the record; and
inferring whether the first event reoccurs based on the second evaluation value and the threshold value;
wherein the first event is inferred as reoccurs and the service corresponding to the first event is automatically performed when the second evaluation value has exceeded the threshold value.

3. The service management method of claim 1, wherein the device status information regarding information of current status of the electronic device comprises all sensor status information of the electronic device, the user operation behavior information comprises information related to application usage and the event triggering information comprises configuration setting information of the electronic device.

4. The service management method of claim 1, wherein each weight corresponds to the frequency of occurrences that the respective possible probability parameter has occurred in the first event.

5. An electronic device, further comprising:
a storage unit, storing a record, wherein the record comprises at least one first event and a plurality of possible probability parameters corresponding thereto and each possible probability parameter has a weight corresponding to the first event; and
a data processing unit coupled to the storage unit, collecting device status information regarding information of current status of the electronic device, user operation behavior information and event triggering information through a data collector, evaluating a first evaluation value according to the device status information regarding information of current status of the electronic device, the user operation behavior information and the event triggering information and the possible probability parameters and respective weights of the record and inferring whether the first event reoccurs based on the first evaluation value and a threshold value;
wherein the data processing unit infers that the first event reoccurs and performs a service corresponding to the first event when the first evaluation value has exceeded a threshold value,
wherein the data processing unit further collects device status information regarding information of current status of the electronic device, the user operation behavior information and the event triggering information through the data collector after performing the service corresponding to the first event, evaluates a second evaluation value according to the device status information, the user operation behavior information and event triggering information of the electronic device and the possible probability parameters and respective weights of the record and infers whether the first event is finished based on the second evaluation value and the threshold value, and
wherein the data processing unit further infers that the first event is finished when the second evaluation value has exceeded the threshold value and automatically terminates the performance of the service corresponding to the first event when inferring that the first event is finished.

6. The electronic device of claim 5, wherein the data processing unit further collects device status information regarding information of current status of a neighboring device of the electronic device, user operation behavior information and event triggering information for the neighboring device of the electronic device through the data collector, evaluates a second evaluation value according to the device status information, the user operation behavior information and event triggering information of the electronic device, the device status information, the user operation behavior information and event triggering information of the neighboring device and the possible probability parameters and respective weights of the record, and infers whether the first event reoccurs based on the second evaluation value and the threshold value,
wherein the data processing unit infers that the first event reoccurs and performs the service corresponding to the first event when the second evaluation value has exceeded the threshold value.

7. The electronic device of claim 5, wherein the device status information regarding information of current status of the electronic device comprises all sensor status information of the electronic device, the user operation behavior information comprises information related to application usage and event triggering information comprises configuration setting information of the electronic device.

8. The electronic device of claim 5, wherein each weight corresponds to the frequency of occurrences that the respective possible probability parameter has occurred in the first event.

9. The electronic device of claim 6, wherein the data processing unit further selectively performs the service on the electronic device or the neighboring device.

10. The electronic device of claim 6, wherein the data processing unit further controls the neighboring device to perform another service.

11. The electronic device of claim 5, wherein the data processing unit further uploads the device status information regarding information of current status of the electronic device, user operation behavior information and event triggering information to an external cloud system such that the external cloud system provides a recommend according to the uploaded information.

\* \* \* \* \*